US005726223A

United States Patent [19]

Okamoto et al.

[11] Patent Number: 5,726,223

[45] Date of Patent: *Mar. 10, 1998

[54] PROCESS FOR PRODUCTION OF POLYMER PARTICLES

[75] Inventors: Masaya Okamoto; Noriyuki Kunishi; Yoshinari Koyama, all of Ichihara, Japan

[73] Assignee: Idemitsu Petrochemical Co., Ltd., Tokyo, Japan

[*] Notice: The term of this patent shall not extend beyond the expiration date of Pat. No. 5,583,166.

[21] Appl. No.: 696,392

[22] Filed: Aug. 14, 1996

Related U.S. Application Data

[62] Division of Ser. No. 391,264, Feb. 21, 1995, Pat. No. 5,583,166, which is a continuation of Ser. No. 166,805, Dec. 13, 1993, abandoned, which is a continuation of Ser. No. 927,658, filed as PCT/JP92/00052 Jan. 23, 1992, abandoned.

[30] Foreign Application Priority Data

Feb. 20, 1991 [JP] Japan .................................. 3-045554
Oct. 24, 1991 [JP] Japan .................................. 3-277621

[51] Int. Cl.⁶ ........................ C08J 3/12; C08J 3/14; C08G 63/62
[52] U.S. Cl. ........................ 523/340; 524/464; 528/491; 528/497; 528/498; 528/501
[58] Field of Search ........................ 524/464; 523/340; 528/491, 497, 498, 501

[56] References Cited

U.S. PATENT DOCUMENTS

| | | | |
|---|---|---|---|
| 3,065,204 | 11/1962 | Dietrich et al. | 528/497 |
| 3,264,264 | 8/1966 | Baker | 528/498 |
| 3,925,329 | 12/1975 | Heinrich et al. | 528/501 |
| 4,074,864 | 2/1978 | Narita et al. | 241/23 |
| 4,452,976 | 6/1984 | Kohyama et al. | 528/501 |
| 4,546,172 | 10/1985 | Kohyama et al. | 528/501 |
| 4,603,194 | 7/1986 | Mendiratta et al. | 528/501 |
| 4,753,994 | 6/1988 | Carter, Jr. et al. | 525/468 |
| 5,196,507 | 3/1993 | Totani et al. | 528/499 |
| 5,583,166 | 12/1996 | Okamoto et al. | 523/340 |

FOREIGN PATENT DOCUMENTS

| | | |
|---|---|---|
| 465967 | 1/1992 | European Pat. Off. . |
| 2286847 | 4/1976 | France . |
| 1171155 | 5/1964 | Germany . |
| 1291119 | 3/1969 | Germany . |
| 49-28642 | 3/1974 | Japan . |
| 57-141427 | 9/1982 | Japan . |
| 2-233733 | 9/1990 | Japan . |
| 4-226541 | 8/1992 | Japan . |
| 1090975 | 11/1967 | United Kingdom ............ 523/328 |

OTHER PUBLICATIONS

Toyota, Keizo; Tanaka, Junji, "Polycarbonate Powder", (1974), Chemical Abstracts, 80, No. 4, Abstract No. 15904y, p. 54, col. 2; of JP-A-47 041 421.

Primary Examiner—Andrew E.C. Merriam
Attorney, Agent, or Firm—Frisahuf, Holtz, Goodman, Langer & Chick, P.C.

[57] ABSTRACT

A process for producing polymer particles from an organic solvent solution of a polymer, which includes: (a) initially introducing polymer particles into a particle producing zone, (b) introducing an organic solvent solution containing an organic solvent and having a polymer concentration of 3 to 70% by weight, onto the polymer particles which are maintained in the particle producing zone, the particle producing zone not substantially containing steam, the organic solvent solution being added in an amount of not more than 250% by weight per hour based on the amount of the polymer particles which are initially held in the particle producing zone, and stirring the polymer particles under conditions in which the organic solvent would be vaporized, (c) separately introducing a poor solvent for the polymer into the particle producing zone, the poor solvent being selected from the group consisting of benzene, toluene, xylene, pentane, hexane, octane, acetone and methyl ethyl ketone, the poor solvent being in an amount of 5 to 200% by weight based on the weight of the organic solvent in the organic solvent solution, and (d) evaporating the organic solvent and the poor solvent, while maintaining the organic solvent solution of the polymer in contact with the polymer particles which are maintained in the particle producing zone, to produce the polymer particles.

15 Claims, 4 Drawing Sheets

PROCESS FOR PRODUCTION OF POLYMER PARTICLES

This is a division of application Ser. No. 08/391,264 filed Feb. 21, 1995 U.S. Pat. No. 5,583,166, which is a continuation application of Ser. No. 08/166,805 filed Dec. 13, 1993 (now abandoned), which is a continuation application of Ser. No. 07/927,658 filed Aug. 26, 1992 (now abandoned), which is a continuation application of the United States designated application of International Application No. PCT/JP92/00052 filed Jan. 23, 1992.

TECHNICAL FIELD

The present invention relates to a process for producing polymer particles. More particularly, it is concerned with a process which basically comprises evaporating an organic solvent while keeping a solution of a polymer in the organic solvent in contact with polymer particles to thereby obtain polymer particles, and a process for efficiently producing polymer particles (powder) which are small in particle diameter, high in bulk density, and reduced in residual solvent and of high quality, which has been developed by improving the above basic technique in various respects as necessary.

BACKGROUND ART

As a process for commercially producing polymers such as polycarbonate, polyarylate and polyester polycarbonate, an interfacial polycondensation method is preferably employed.

In the interfacial polycondensation method, for example, of polycarbonate, an emulsion solution obtained after completion of the reaction is subjected to a washing and separation operation to obtain a methylene chloride solution of polycarbonate. Thereafter, from the methylene chloride solution of polycarbonate (PCM), polycarbonate is isolated to produce the polycarbonate.

As a method of isolating polycarbonate from the methylene chloride solution of polycarbonate, various ones are under investigation.

For example, a method of adding a poor solvent to the solution of polycarbonate (Japanese Patent Publication No. 14474/1967), a grinding method with a kneader, utilizing crystallization of a polycarbonate solution (Japanese Patent Publication No. 15899/1987), a method of throwing into hot water (Japanese Patent Application Laid-Open No. 115625/1985), and so forth are known.

All of these methods, however, are increased in plant cost, as a method of isolating polymers such as polycarbonate, and thus have a problem in respect of cost. Therefor in order to decrease the cost, a more simplified isolating method is desired.

As methods for solving the problems, improved techniques are disclosed in Japanese Patent Publication No. 54329/1985 and Japanese Patent Publication No. 45648/1990.

In any of the methods disclosed therein, however, steam or nitrogen gas, etc. are needed for evaporation of methylene chloride as the solvent, and they still have a problem of recovery of removed solvent. Furthermore they have problems that only polymer particles having large particle diameters are obtained, and large equipment and a lot of energy are needed for removal of the solvent. Furthermore they have problems that water accumulates in the system, which will need an operation to withdraw the water, and at the same time, polymers obtained contain a large amount of water.

DISCLOSURE OF INVENTION

In view of the above circumstances, the present inventors made extensive investigations to develop a process for producing polymer particles, which is of low cost, more simplified, and of high productivity and high efficiency, and furthermore which provides polymer particles which are decreased in introduction of other components into the polymer, have small particle diameters, have high bulk densities, and are of high quality. As a result, it has been discovered that the above objects are attained by employing the basic technique that while keeping an organic solvent solution of polymer in contact with polymer particles under specified conditions, the organic solvent is evaporated, and further by applying various improved modifications onto the above basic technique. The present invention has been accomplished based on the above findings.

That is, the present invention provides a process for producing polymer particles from an organic solvent solution of the polymer which comprises feeding the organic solvent solution of polymer into a particle forming zone which does not substantially contain steam, is maintained in an atmosphere in which the organic solvent is vaporisable, and which contains polymer particles under stirring, and evaporating the organic solvent while keeping the solution in contact with the polymer particles.

Figure 1:
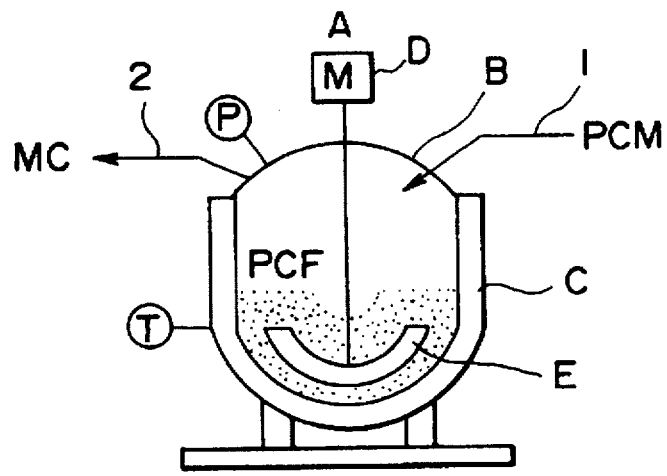
FIG. 1 is a schematic view illustrating an example of a basic solvent removing apparatus suitable for the practice of the process of the present invention.

A: Solvent removing apparatus
B: Particle producing vessel
C: Jacket
D: Mixer
E: Blade of the mixer
F: Organic solvent solution of polymer
G: heater
H: Cooler
J: Recovered solvent
K: Exhaust
L: Polymer particles
N: Poor solvent
Q: Breaker
M: Motor of the mixer, motor of the breaker
P: Pressure gauge
T: Thermometer
1: Organic solvent solution feeding pipe a, b, c, d, e, f, g, h, i, j: Organic solvent solution divided feeding pipes
2: Organic solvent solution exhaust pipe
3: Exhaust valve
4: Exhaust pipe 5: Poor solvent feeding pipe (for the particle producing vessel)

BEST MODE FOR CARRYING OUT THE INVENTION

As polymers to which the process of the present invention is applied, polycarbonate and polyarylate are most suitable. In addition, various polymers formed by solution polymerization, such as polyester polycarbonate and polyamide, can be employed.

Of these, a polycarbonate solution, for example, is obtained by the usual polycondensation reaction, and can be easily produced by reacting divalent phenol and phosgene or a carbonic acid ester compound.

As the dihydric phenol, for example, hydroquinone, 4,4' dihydroxydiphenyl, bis(4-hydroxyphenyl)alkane (bisphenol A, etc.), bis(4-hydroxyphenyl)cycloalkane, bis(4-hydroxyphenyl)oxide, bis(4-hydroxyphenyl)sulfide, bis(4-hydroxyphenyl)sulfone, bis(4-hydroxy-phenyl)ketone, etc., and their halogen-substituted compounds can be listed.

As the carbonic acid ester compound, diaryl carbonate such as diphenyl carbonate, and dialkyl carbonate such as dimethyl carbonate and diethyl carbonate can be listed.

In accordance with the phosgene method, for example, most typically, it can be obtained by reacting bisphenol A and phosgene in an inert solvent, such as methylene chloride, in the presence of a tertiary amine (e.g., triethylamine) catalyst.

On the other hand, the polyarylate solution is obtained by the usual polycondensation reaction and can be easily produced by reacting dihydric phenol and terephthalic acid dichloride or isophthalic acid dichloride, for example.

As the dihydric phenol, like in the above case, hydroquinone, 4,4'-dihydroxydiphenyl, bis(4-hydroxyphenyl)alkane (bisphenol A, etc.), bis(4-hydroxyphenyl)cycloalkane, bis(4-hydroxyphenyl)oxide, bis(4-hydroxyphenyl)sulfide, bis(4-hydroxyphenyl)sulfone, etc., and their halogen substituted compounds can be listed.

As the organic solvent to be used in the present invention, those substantially inactive to the polymer, and further substantially stable at temperatures at which they are used, and capable of dissolving the polymer can be used. However, in the case of those having a high boiling point, in order to achieve efficient removal through evaporation of the solvent, it is desirable that the heating temperature of the polymer solution is increased. Thus, taking into consideration the removal of the organic solvent from the polymer particles, it is preferred that organic solvents having boiling points of not more than 200° C. be used.

As these organic solvents, in the case of polycarbonate, for example, as well as methylene chloride which is usually preferably used, chlorine-containing solvents such as chloroform, chlorobenzene and the like, and solvents such as dioxane, tetrahydrofuran and the like can be used.

These solvents may contain a poor solvent to the extent that no polymer is precipitated. The poor solvent includes aromatic compounds such as benzene, toluene, xylene and the like, alkanes such as pentane, hexane, heptane, octane and the like, ketones such as acetone, methyl ethyl ketone and the like, and their mixed solvents. Of these, alkanes having 5 to 10 carbon atoms are preferred from operation and cost, and further because they can be easily removed from the polymer. These poor solvents may be gasified and supplied in the form of vapor, and there may be employed either by a method in which it is supplied when the organic solvent solution of the polymer is introduced into the particle producing vessel or a method in which it is supplied directly to the particle producing vessel.

The concentration of the polymer dissolved in the above solvent is 3 to 70% by weight and preferably 10 to 60% by weight. If the concentration is less than 3% by weight, the amount of the solvent to be recovered is increased, leading to a decrease in productivity; it is not efficient. If it is more than 70% by weight, the solution becomes solid-like, leading to a decrease in fluidity, and its introduction into the solvent removing apparatus and operation undesiraly become difficult. When the concentration of the organic solvent solution of the polymer is more than 40% by weight, in some cases, gelation occurs; the solution may be caused to gel.

The organic solvent solution of the polymer prepared using the organic solvent as described above is supplied to the particle producing zone (for example, the particle producing vessel and the particle producing apparatus) which is maintained in an organic solvent vaporizing atmosphere and in which there are polymer particles under stirring.

The amount of the organic solvent solution of the polymer being supplied varies depending on various conditions and cannot be determined unconditionally; usually, based on the amount of the polymer particles held in the particle producing zone, it is not more than 250% by weight per hour preferably not more than 100% by weight per hour. If the amount supplied is too small, productivity is decreased, and if the amount supplied is too large, the amount of the residual solvent in the polymer particles obtained is increased, leading to a decrease in quality, which is not preferable.

In connection with the supplying method, the organic solvent solution of the polymer may be dropped or flown onto the polymer particles remaining in the particle producing vessel. It may be introduced into moving polymer particles. Furthermore, the organic solvent solution of the polymer may be heated and pressed, and flashed in the particle producing vessel. If the concentration of the organic solvent solution of the polymer is high (not less than 40% by weight), in some cases, the fluidity of the organic solvent solution is somewhat decreased; in such a case, it is desirable that the solution be introduced into the particle producing vessel simultaneously with its withdrawal from the heater.

Next, with regard to operating conditions of the solvent removing apparatus, it suffices that the particle producing zone is maintained in an organic solvent vaporizing atmosphere; usually, the temperature is maintained at 0 to 200° C. and preferably 30°to 150° C. If the temperature of the particle producing zone is less than 0° C., the evaporation rate of the organic solvent is decreased, leading to a decrease in productivity, which is not preferable. If it is more than 200° C., deterioration of the polymer obtained and decomposition of the solvent undesirably start to occur.

The pressure of the particle producing zone may be any of reduced pressure, atmospheric pressure and under pressure; it is maintained at 0.1 to 11 $kg/cm^2$ (absolute pressure) and preferably 0.5 to 5 $kg/cm^2$ (absolute pressure). If the pressure is less than 0.1 $kg/cm^2$ (absolute pressure), costs for vacuum operation are undesirably increased. If is more than 11 $kg/cm^2$ (absolute pressure), the evaporation rate of the organic solvent is decreased and a pressure particle producing vessel and so forth are required, which become disadvantageous from a view point of costs.

The residence time of the polymer in the particle producing zone is usually 0.01 to 10 hours although it varies depending on the amount of the organic solvent of the polymer to be supplied. If the residence time is short, the amount of the polymer particles held is decreased, and sufficient stirring and mixing are not expected, which is not desirable. If the residence time is long, an unnecessary large particle producing vessel and the like are needed, which is a disadvantage from a view point of cost and is not desirable.

The present invention is characterized in that for the removal of the organic solvent from the organic solvent solution of the polymer, the organic solvent is evaporated while keeping the organic solvent in contact with the polymer particles. That is, in the particle producing zone, the polymer particles are introduced in advance in order to evaporate the organic solvent. With regard to the polymer to be introduced into the particle producing zone in advance, at the beginning of the operation, polymer particles previously produced may be charged. At the stage that the stationary operation starts, polymer particles produced fulfills the same function as the polymer particles previously introduced, permitting continuous operation, and thus the polymer can be produced efficiently. For example, in the case of polycarbonate, as the polycarbonate particles, polycarbonate flakes (PCF) in a flake form are used, and their particle diameters are preferably within the range of 50 µm to 3 mm. If the particle diameter is less than 50 µm or more than 3 mm, the polycarbonate forms a clump and becomes difficult to be powdered, which is not desirable.

The amount of polymer particles charged, said polymer particles being to be introduced into the particle producing zone, is not critical, but should be determined so that both at the start of operation and at the stationary operation polymer particles flow and can be stirred homogeneously at least when the mixer is operated. Polymer particles at the earlier stage of operation may be the same or different.

The present invention will hereinafter be explained referring to the drawings.

As the particle producing vessel B constituting the main part of the solvent removing apparatus A, either a vertical one or a horizontal one can be used any one used for mixing and stirring of fluid or powder can be used.

Production of polycarbonate with the solvent removing apparatus of FIG. 1 will be explained.

In the first place, the solvent removing apparatus A comprises a mixer D having a stirring blade E to stir polycarbonate flake PCF, and a particle producing vessel B equipped with a jacket C for controlling temperature. In the upper part of the particle producing vessel B, there are provided an organic solvent solution feeding pipe 1 to supply the organic solvent solution of polycarbonate F (PCM), and an organic solvent discharging pipe 2 to discharge an evaporated organic solvent MC. There are no special limitations to the shape and so forth of the stirring blade E, and any one can be used as long as it can uniformly and sufficiently stir the above polycarbonate flake PCF. In the figures, P indicates a pressure gage, T indicates a thermometer, and M indicates a stirring blade driving motor.

In the process of the present invention, the aforementioned polycarbonate flake PCF is introduced into the particle producing vessel B as described above, and the starting material of polycarbonate organic solvent solution F (PCM) is supplied while uniformly stirring with the stirring blade E.

Figure 2:
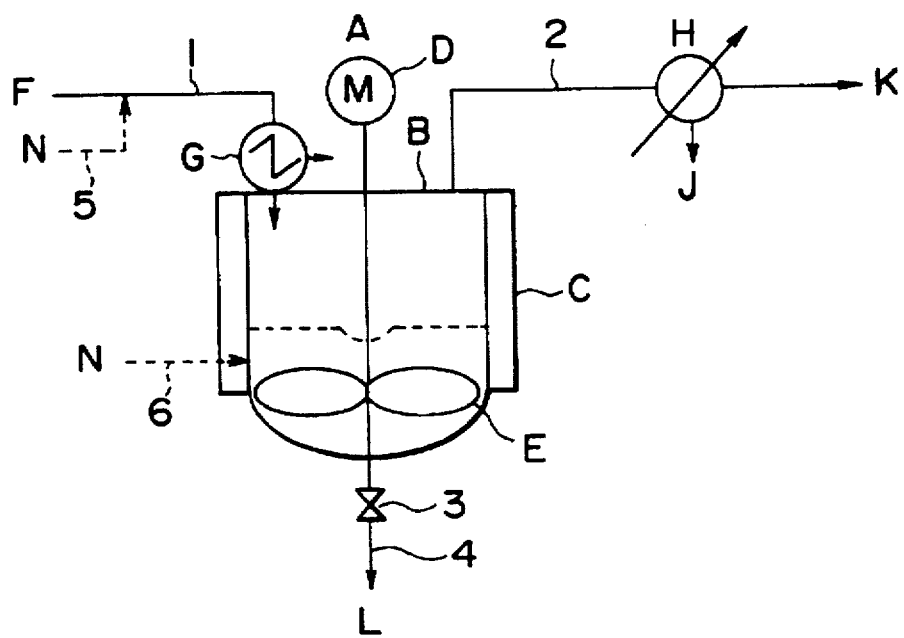
FIG. 2 is a schematic view illustrating another example of a basic solvent removing apparatus suitable for practice of the present invention.

Then, in the solvent removing apparatus of FIG. 2, the particle producing vessel B is preferably provided with the jacket C which enables to control the temperature of the particle producing vessel B with a heating medium, in order to evaporate the organic solvent. The particle producing vessel B is further provided with the mixer D having the stirring blade E to stir polymer particles L. In the particle producing vessel B, there are provided an organic solvent solution feeding pipe 1 to appropriately control the temperature of the organic solvent solution of polymer F with the heater G and supply it, an organic solvent discharging pipe to exhaust K 2 to discharge the organic solvent evaporated by contact with the polymer particle L introduced into the particle producing vessel, a cooler H to condense the evaporated and discharged organic solvent and reuse it as a recovered solvent J, and so forth. The particle producing vessel B and the organic solvent solution feeding pipe 1 may be provided with poor solvent feeding pipes 5 and 6 to supply a poor solvent N, if necessary. Additionally, the particle producing vessel B is provided with a discharge pipe 4 having a discharge valve 3 to withdraw the formed polymer particle L. In the figures, M indicates a stirring blade driving motor like in the aforementioned case.

For efficient production of polymer particles in the solvent removing apparatus A of FIG. 2, in the first place, the particle producing vessel B is controlled to a predetermined temperature with the jacket C in order to maintain an atmosphere in which the organic solvent evaporates. Into the particle producing vessel B controlled to the predetermined temperature, the organic solvent solution of polymer F is supplied from the organic solvent solution feeding pipe 1, if necessary, after heating to a predetermined temperature with the heater G. Into the particle producing vessel B, polymer particles previously produced are introduced at an earlier stage of operation, and they are allowed to stay by uniformly stirring with the mixer D. By evaporating the organic solvent while keeping the organic solvent solution of polymer F supplied in contact with the polymer particle L staying under uniform stirring, the polymer particle L is formed. The polymer particle L formed in the particle producing vessel B is withdrawn through the discharge pipe 4 by opening or closing the discharge valve 3, and then sent to the subsequent step.

In the process for production of polymer particles of the present invention, polymer particles having a small particle diameter, a decreased amount of remaining solvent, and a high bulk density can be obtained by using the poor solvent N in combination.

That is to say, in the process for producing polymer particles from the organic solvent solution of polymer, the organic solvent solution of polymer, containing the poor solvent for the polymer, is supplied and the organic solvent is evaporated while keeping the solution in contact with the above polymer particle, whereby the object can be attained.

The amount of the poor solvent added to the organic solvent solution of polymer, i.e., amount=(amount of poor solvent)/(amount of the polymer solution ×concentration of the polymer solution)×100%, is 5 to 50% by weight and preferably 10 to 50% by weight based on the amount of polymer solids.

If the amount of the poor solvent added is less than 5% by weight, drying properties of the particle are sometimes deteriorated, which is not desirable. On the other hand, if it is more than 50% by weight, in some cases, the bulk density after drying is undesirably decreased.

The poor solvent is as described above, and includes aromatic compounds such as benzene, toluene and xylene, alkanes such as pentane, hexane, heptane, and octane, ketones such as acetone and methyl ethyl ketone, and mixed solvents thereof. Of these, alkanes having 5 to 10 carbon atoms are preferred from viewpoints of operation and cost, and further because they can be easily removed from the polymer.

Taking the solvent removing apparatus of FIG. 2 as an example, the poor solvent N is supplied at the same time through the poor solvent feeding pipe 5 when the organic solvent solution of polymer F, containing the poor solvent N for the polymer, is introduced into the particle producing vessel B, or when the organic solvent solution of polymer F is introduced into the particle producing vessel B. The poor solvent N is introduced into the particle producing vessel B from the poor solvent feeding pipe 3 concurrently with the introduction of the organic solvent solution of polymer F into the particle producing vessel B. For introduction of the poor solvent N into the particle producing vessel B from the poor solvent feeding pipe 6, the poor solvent N may be introduced as it is or after gasification thereof.

Furthermore, by introducing the poor solvent into the particle producing vessel after gasification thereof, there can be obtained polymer particles which are small in particle diameter, and further reduced in the residual solvent and high in bulk density.

That is to say, in the process for production of polymer particles from the organic solvent solution of polymer, the objects can be attained by feeding the organic solvent solution of polymer, while at the same time feeding the poor solvent for the polymer in the amount of 5 to 200% by weight of the organic solvent of the above organic solvent solution, after gasification thereof, and evaporating the organic solvent while keeping the above solution in contact with the above polymer particle. The poor solvent as herein gasified is utilized as a heat source for evaporation of the above organic solvent by itself. The poor solvent is as described above.

The amount of the poor solvent fed to the organic solvent solution of polymer is, based on the organic solvent in the organic solvent solution of polymer, 5 to 200% by weight and preferably 10 to 150% by weight. If the amount of the poor solvent supplied is less than 5% by weight, in some cases, drying properties of the particles are undesirably deteriorated. If it is more than 200% by weight, in some cases, the bulk density after drying is undesirably decreased.

Furthermore, when the organic solvent is evaporated while keeping the organic solvent solution in contact with the polymer particles in the particle producing vessel equipped with the mixer to stir the polymer particles in the particle producing vessel and a breaker capable of breaking the polymer particles, polymer particles having a large bulk density and a decreased amount of residual solvent can be obtained.

That is to say, in the process for production of polymer particles from the organic solvent solution of polymer, the objects can be attained by introducing the organic solvent solution of polymer into a particle producing zone equipped with the mixer to make the polymer particles flow and the breaker capable of breaking them, in which there are polymer particles under stirring, and evaporating the organic solvent while keeping the above solution in contact with polymer particles which are being pulverized while flowing in the above particle producing zone.

Figure 3:
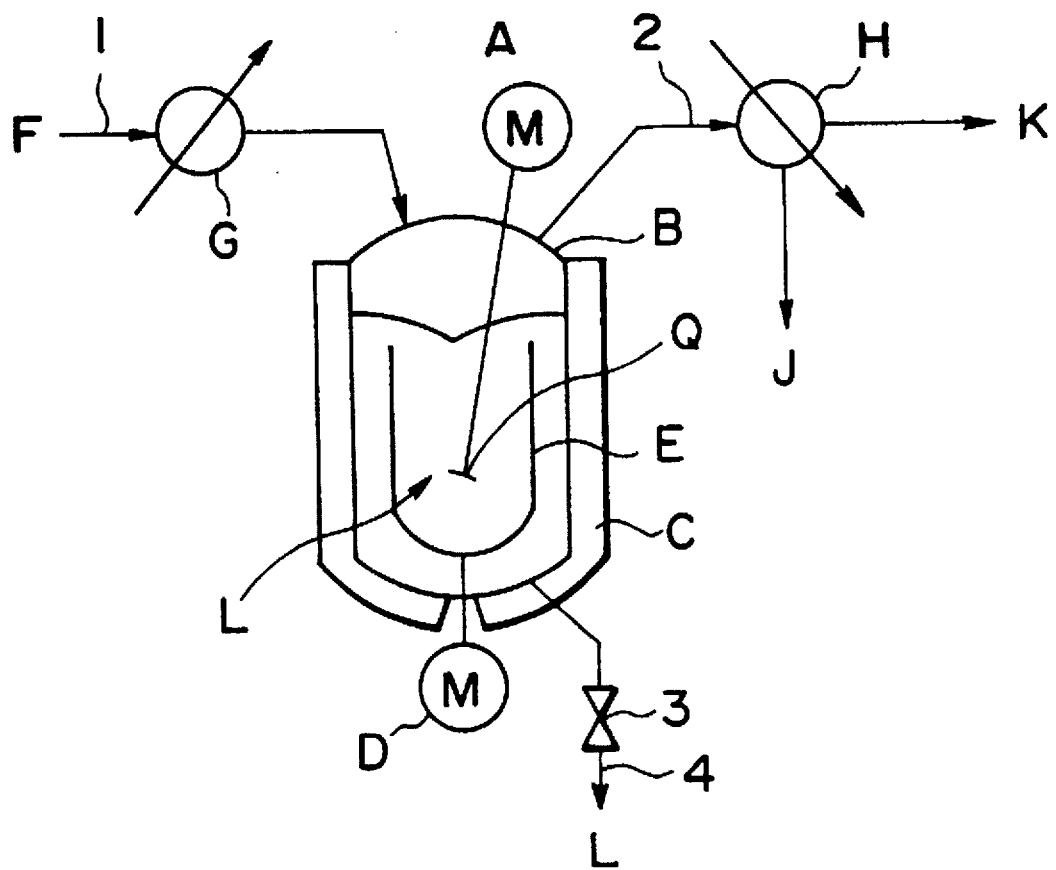
FIG. 3 is a schematic view illustrating an example of a solvent removing apparatus suitable for practice of the process of the present invention.

Referring to the solvent removing apparatus of FIG. 3, for example, there is used a particle producing vessel B equipped with a mixer D to stir a polymer particle L and breaker Q capable of breaking the polymer particle L. The shape of the mixer D is as described above, and the shape and so on of the breaker Q are not critical; any structure can be employed as long as it enables to uniformly stir the polymer particle L and to break at least part of the polymer particle L. For example, the mixer D is as described above, and as the breaker Q, those in a crusher form as generally employed or having a high performance rotary blade are suitable. The mixer and the breaker may be either common or different. As other devices attached onto the particle producing vessel A, those in common with FIG. 1 or FIG. 2 can be used.

In the process for production of polymer particles from the organic solvent solution of polymer, by introducing polymer particles of 3 to 150% by weight of the organic solvent solution of polymer into the particle producing zone, and evaporating the organic solvent while keeping the organic solvent solution in contact with the polymer particles, polymer particles having a small particle diameter, a high bulk density and excellent in quality can be produced continuously and with high productivity.

Figure 4:
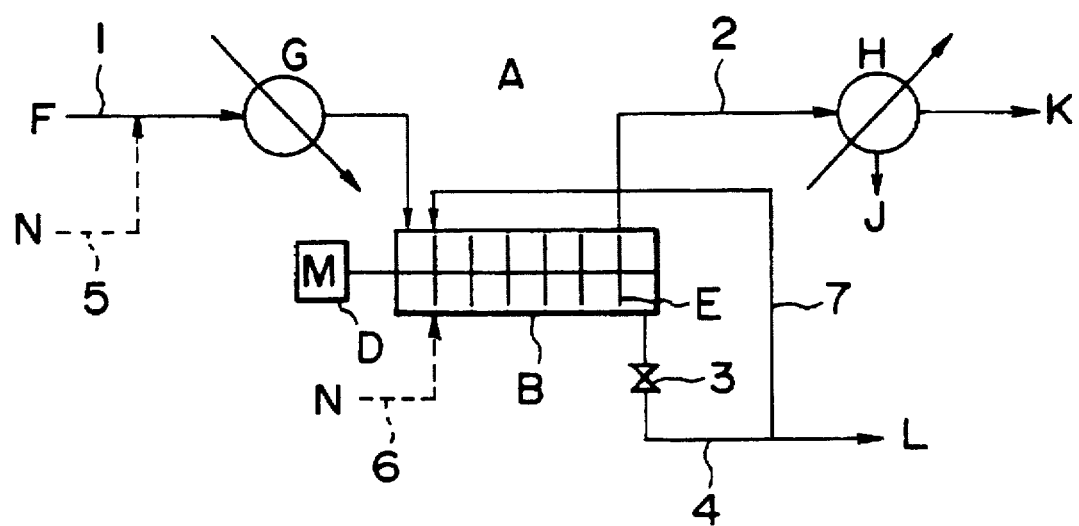
FIG. 4 is a schematic view illustrating an example of a horizontal type solvent removing apparatus suitable for practice of the process of the present invention

Referring to the solvent removing apparatus of FIG. 4, for example, the polymer particle L formed in the particle producing vessel B is withdrawn through the discharge pipe 4 having the discharge valve 3, and sent to the subsequent step. At this step, part of the polymer particle L withdrawn is introduced into the particle producing vessel B through a recycle pipe 7, brought into contact with the organic solvent solution of polymer, and recycled. By operating in this way, the polymer particle L can be produced continuously. As a result, the amount to be processed in the particle producing vessel B is increased and, therefore, productivity can be increased to two or three times the usual one and at the same time, there can be obtained polymers excellent in quality.

Furthermore, when the present invention is intended to produce polymer particles continuously and with high productivity, the object can be attained by using a horizontal particle producing vessel. That is to say, in the process of the present invention, the organic solvent solution of polymer is introduced into the horizontal particle producing vessel having the particle producing zone which is maintained in the atmosphere that does not substantially contain steam and the organic solvent is vaporizable, and in which there are polymer particles under stirring, and evaporating the organic solvent while keeping the organic solvent solution of polymer in contact with the above polymer particles.

In particular, the object can be attained more effectively by introducing the organic solvent solution of polymer in such a manner that it is divided and introduced into the horizontal polymer producing vessel through several points, thereby evaporating the organic solvent.

Figure 5:
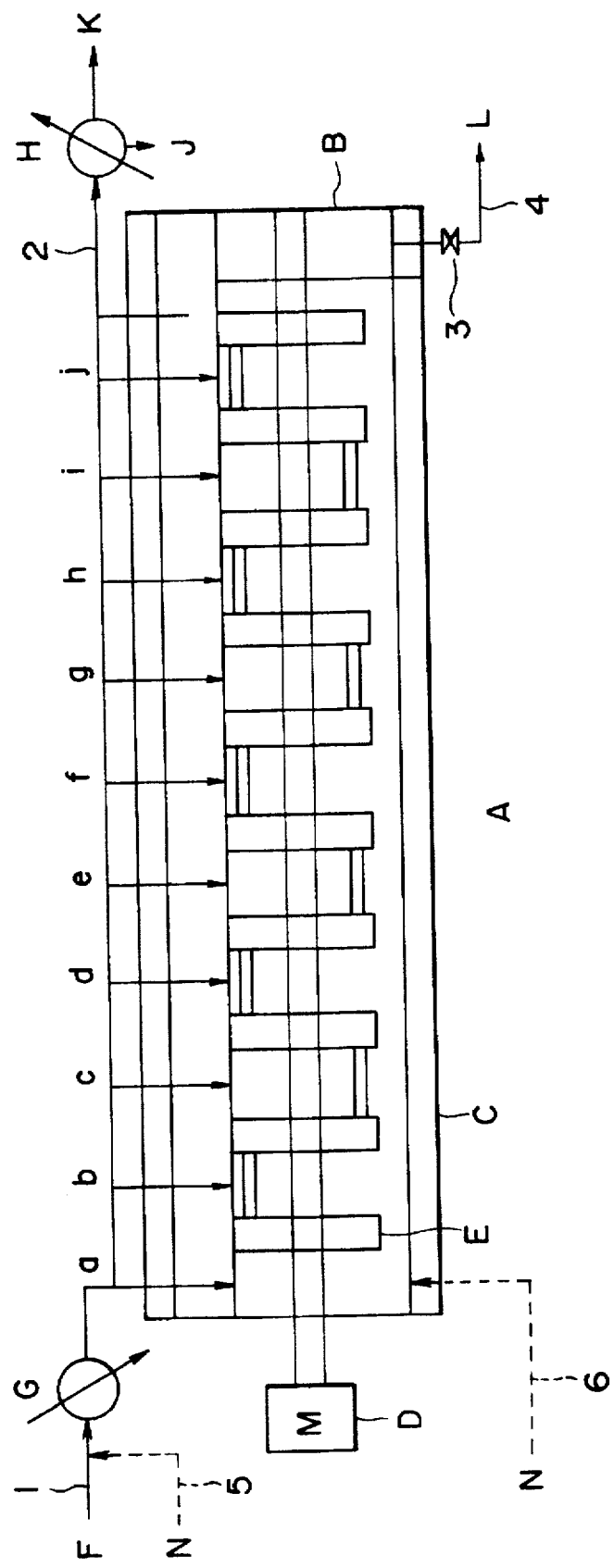
FIG. 5 is a schematic view illustrating another example of a horizontal type solvent removing apparatus suitable for practice of the process of the present invention.

FIG. 5 is a view illustrating an example of the solvent removing apparatus, suitable for practice of the process for producing continuously and with high productivity.

That is to say, in the solvent removing apparatus of FIG. 5, as the particle producing vessel B, it is characterized by using a horizontal one, and the one equipped with the mixer D with a paddle to mix the polymer particle L and having the structure (not shown) enabling a heat medium to flow in the rotor and the paddle is preferably used. The shape and so on of the paddle of the stirrer D is not critical; any one can be used as long as it can stir uniformly and thoroughly the polymer particle L present in the particle producing vessel. The amount of the polymer particle L charged, i.e., introduced into and present in the particle producing vessel B, is not critical, but the amount should be chosen so that both at the start of operation and the stationary operation, at least when the mixer is operated, the polymer particle flows and is stirred uniformly.

To obtain the polymer particle with the solvent removing apparatus as described above, at the beginning, the particle producing vessel B is adjusted to the predetermined temperature with the jacket C in order to maintain it in the atmosphere that the organic solvent is vaporizable. Into the particle producing vessel B adjusted to the predetermined temperature, the organic solvent solution of polymer F is introduced through the organic solvent solution feeding pipe 1, if necessary, after being heated to the predetermined temperature with the heater G. The organic solvent solution of polymer F may be divided and introduced through organic solvent solution divided feeding pipes a, b, c, d, . . . , depending on the desired production amount. In the particle producing vessel B, polymer particles produced in advance are introduced, and allowed to stay by uniformly stirring with the stirrer D, at the beginning of operation. By evaporating the organic solvent while keeping the organic solvent solution of polymer F introduced, into contact with the polymer particle L staying under uniform stirring, the polymer particle L is formed. The polymer particle L formed in the particle producing vessel B is withdrawn through the discharge pipe 4 by opening and closing the discharge valve 3, and sent to the subsequent step.

In this way, the polymer particle L excellent in quality can be obtained.

In the process of production of the present invention, the basic technique is such that while keeping the organic solvent solution of polymer in contact with the polymer particle, the organic solvent is evaporated, and by adding new techniques to the basic technique, polymer particles (powder) having a small particle diameter, a high bulk density, a decreased amount of residual solvent and excellent quality can be produced according to an efficient method which is of low cost, is more simplified, and is of higher productivity.

In practice of the process of the present invention on a commercial scale, as the particle producing vessel, a disc drier, a paddle mixer, a rotary drum type mixer, a ribbon drier, and so forth are suitably used. Of these, a particle producing vessel designed so that during the interval between the introduction of the organic solvent solution of polymer and the discharge of the polymer particles, the organic solvent can be evaporated while stirring the organic solvent solution of polymer introduced, and the polymer particles can be withdrawn successively from the discharge pipe, is preferably employed. For example, a Henschel mixer manufactured by Mitsui Miike Kakoki Co., Ltd., a Nauter mixer manufactured by Hosokawa Micron Co., Ltd., Turbo Sphere Mixer manufactured by Sumitomo Jukikai Kogyo Co., Ltd., a turbulizer manufactured by Hosokawa Micron Co., Ltd., a paddle drier and a feed back paddle drier manufactured by Nara Kikai Co., Ltd., an ink line disc type drier, a rotary disc T-type drier and a paddle type drier manufactured by Tsukishima Kikai Co., Ltd., a CD drier manufactured by Kurimoto Tekojo Co., Ltd., a Tolus disc and a micron thermoprocessor manufactured by Hosokawa Micron Co., Ltd., a vacuum mixing dryer manufactured by Tamagawa Machinery Co., Ltd., and so on are suitable. As equipment for mixing of particles, a kneader, a paddle mixer, a rotary drum type mixer, a ribbon drier, a disc drier and so on are suitably used. As the mixing blade, a helical blade, a paddle blade, a lattice blade, a paddle type blade, and so on are suitable.

Into the particle producing vessel, inert gas such as nitrogen and air may be introduced in combination with the organic solvent solution of polymer within the range that does not substantially cause problems. The solvent removed by evaporation from the particle producing vessel may be reused by condensing and recovering with a cooler.

The polymer particle formed in the particle producing vessel is continuously discharged from the lower part of the particle producing vessel through the discharge pipe by opening and closing the discharge valve, e.g., a rotary valve. It is also possible that a dam is provided depending on the level of the polymer particle in the particle producing vessel, and it is allowed to overflow the dam. Furthermore, when the inside of the particle producing vessel is under pressure, the polymer particle can be discharged utilizing the inner pressure. As the apparatus for discharging, for example, an apparatus provided with a screw conveyer, for example, can be used.

The present invention is described in more detail with reference to the following examples and comparative examples. First, in Examples 1 to 14 and Comparative Example 1, as the polycarbonate, Toughlon A2500 produced by Idemitsu Petrochemical Co., Ltd. was used, and dissolved in methylene chloride (special grade, produced by Hiroshima Wako Junyaku Co., Ltd.) to prepare a methylene chloride solution of polycarbonate (PCM). As the polycarbonate flake (PCF), the one obtained by sieving Toughlon FN2200 (produced by Idemitsu Petrochemical Co., Ltd.) to an average particle diameter of 0.5 mm was used.

EXAMPLE 1

A versatile mixer 5 DMV manufactured by Sanei Seisakujo Co., Ltd., was charged with 500 g of PCF, and 30% by weight of PCM was introduced with stirring at a rate of 400 g per hour. During the introduction, the temperature was maintained at 50° C., and the pressure, at −400 mmHg. The introduction was continued for 10 hours, and after the degree of vacuum was controlled to less than −700 mmHg and the contents were stirred for about 30 minutes, the mixer was opened and the objective product was obtained.

EXAMPLE 2

The procedure of Example 1 was repeated with the exception that the concentration of PCM was charged to 10% by weight.

EXAMPLE 3

The procedure of Example 1 was repeated with the exception that the temperature was maintained at 110° C., and the pressure, at 5 kg/cm$^2$.

EXAMPLE 4

A waring blender Blender 7011S manufactured by Brerbach was used, and a stainless steel container No. 8525 manufactured by Eberbach was charged with 100 g of PCF and 30% by weight of PCM was introduced with stirring at a rate of 90 g per hour. The temperature during the introduction was 60 to 70° C. The pressure was atmospheric pressure (open system). The introduction was continued for 5 hours, and then the container was closed and the degree of vacuum was controlled to less than −700 mmHg. After the contents were stirred for about 30 minutes, the objective product was obtained.

EXAMPLE 5

A 50-liter volume mixing vessel having a helical blade was charged with 10 kg of PCF, and 30% by weight of PCM was introduced with stirring at a rate of 9 kg per hour. During the introduction, the temperature was maintained at 90° C., and the pressure, at −400 mmHg. During the operation, the flake formed by a two stage damper was withdrawn in about 1.3 kg portions at 30 minute intervals. The operation was conducted for 24 hours, and about 65 kg of PCF was obtained. This PCF was maintained for about 30 minutes at a temperature of 50° C. and a degree of vacuum of −700 mmHg to obtain the objective product.

EXAMPLE 6

The procedure of Example 1 was repeated with the exception that the rate of introduction of PCM was changed to 1,000 g per hour.

EXAMPLE 7

The procedure of Example 2 was repeated with the exception that the rate of introduction of PCM was changed to 1,000 g per hour.

EXAMPLE 8

The procedure of Example 1 was repeated with the exception that the rate of introduction of PCM was changed to 2,000 g per hour.

COMPARATIVE EXAMPLE 1

The procedure of Example 1 was repeated with the exception that the amount of PCF was changed to 50 g, and PCM was introduced at a rate of 40 g per hour.

However, since the amount of PCF was too small, uniform stirring could not be attained, the contents became solid, and no flake could be obtained.

The flakes obtained in Examples 1 to 8 were measured for average particle diameter, bulk density and the amount of residual methylene chloride (MC) for the evaluation of quality thereof. The results are shown in Table 1.

EXAMPLES 9 to 14

As the particle producing vessel, a 10-liter volume (jacketed) one to the upper part of which was directly attached a heater having a heat conductive area of 62.5 cm² (as a heat exchanger medium, 200 pound steam was used), was used.

In the autoclave, 1,000 g of PCF was placed, and it was stirred and maintained at 50° C. and atmospheric pressure. Then, (a) wt % of PCM was introduced into the heater at a rate of (b) g per hour. As the poor solvent, n-heptane was introduced from the side part of the autoclave at a rate of (c) g per hour.

When the amount of PC in the PCM introduced reached 500 g, about 500 g of PCF was withdrawn from the bottom. This operation was repeated until the total operation time was 20 hours. The PCF thus obtained was dried at 50° C. and less than −700 mmHg for 30 minutes. The evaluation of quality was conducted on the PCF withdrawn at the fourth operation.

The values of (a), (b) and (c) in Examples 9 to 14, and the concentration of PCM introduced into the autoclave are shown in Table 2.

The flakes obtained in Examples 9 to 14 were measured for average particle diameter, bulk density and the amount of residual methylene chloride (MC) for the evaluation of quality thereof. The results are shown in Table 3.

TABLE 1

| No. | Average Particle Diameter (mm) | Bulk Density (g/cc) | Residual MC (ppm by weight) |
| --- | --- | --- | --- |
| Example 1 | 1.42 | 0.58 | 2,100 |
| Example 2 | 1.50 | 0.56 | 2,100 |
| Example 3 | 1.44 | 0.55 | 2,500 |
| Example 4 | 1.48 | 0.52 | 2,400 |
| Example 5 | 1.44 | 0.59 | 2,100 |
| Example 6 | 1.42 | 0.57 | 2,100 |
| Example 7 | 1.38 | 0.55 | 2,400 |
| Example 8 | 1.35 | 0.57 | 2,500 |

TABLE 2

| No. | a | b | c | PCM Concentration (wt %) |
| --- | --- | --- | --- | --- |
| Example 9 | 30 | 1,670 | 0 | 50 |
| Example 10 | 20 | 1,250 | 0 | 43 |
| Example 11 | 30 | 1,333 | 0 | 60 |
| Example 12 | 30 | 1,670 | 100 | 50 |
| Example 13 | 30 | 1,670 | 200 | 50 |
| Example 14 | 30 | 1,670 | 500 | 50 |

TABLE 3

| No. | Average Particle Diameter (mm) | Bulk Density (g/cc) | Residual MC (ppm by weight) |
| --- | --- | --- | --- |
| Example 9 | 1.40 | 0.55 | 2,100 |
| Example 10 | 1.33 | 0.56 | 2,200 |
| Example 11 | 1.29 | 0.54 | 2,000 |
| Example 12 | 0.62 | 0.58 | 500 |
| Example 13 | 0.48 | 0.55 | 450 |
| Example 14 | 0.30 | 0.54 | 200 |

EXAMPLE 15

As the polymer solution, a polycarbonate solution having a concentration of 15% by weight was prepared by dissolving polycarbonate Toughlon A2200 produced by Idemitsu Petrochemical Co., Ltd., in methylene chloride (produced by Hiroshima Wako Junyaku Co., Ltd., special Grade). As the polymer solvent removing apparatus (particle producing machine), a Turbo Sphere mixer (manufactured by Sumitomo Jukikai Kogyo Co., Ltd.) was used. This solvent removing apparatus had a 80-liter volume spherical vessel, to the lower part of which was attached a mixer blade as an anchor type structure to sweep 50% of the surface in the vessel, and in which a pulverizer having a blade diameter of 80 mm was provided downwards from the upper part thereof.

In this spherical vessel, as seed powder at the time of particle production, 50 liters of polycarbonate powder adjusted to about 1 mm in particle diameter was placed. The mixer blade was rotated at 100 rpm and the pulverizer was rotated at 1,500 rpm, both in the powder layer, while at the same time heating of the jacket was started. When the temperature of the polycarbonate powder reached about 70° C., the above polycarbonate solution was introduced from the upper gas phase portion at a rate of 50 liters/hour. The pressure was controlled so as to be about 0.8 kg/cm² (absolute pressure). After the start of operation, in order to make the amount of powder in the vessel hold a level nearly equal to that of the amount of powder charged at the beginning, an operation to semicontinuously withdraw the polycarbonate powder obtained was conducted.

Five hours after the start of operation, the introduction of the polymer solution was stopped and the test was ended. The particle diameter of the polycarbonate powder obtained was consistently about 1 to 2 mm (average particle diameter 1.8 mm) during the test period, and it was found that the powder having a uniform particle diameter could be obtained. Measurement of the bulk density of the powder showed that the bulk density was 0.62 (g/cc) and the powder was very bulky. Furthermore, during the operation, the stirring could be conducted always in a stabilized manner. After the end of the operation, the vessel was opened and the state therein was examined; it was found that almost uniform particle production and stirring could be attained although some agglomerates were formed. Almost no attachment onto the blade and the wall surface was observed.

EXAMPLE 16

By repeating the operation of Example 15 with the exception that the concentration of the polymer solution was changed to 25% by weight, a powder having an average particle diameter of 2.2 mm and a bulk density of 0.52 (g/cc) could be obtained.

EXAMPLE 17

As the polymer, polycarbonate (produced by Idemitsu Petrochemical Co., Ltd., trade name: Toughlon A2200) was used. This was dissolved in methylene chloride (produced by Hiroshima Wako Junyaku Co., Ltd., special grade) in a polymer concentration of about 20% by weight, to prepare a methylene chloride solution of polycarbonate. To this methylene chloride solution of polycarbonate was added polycarbonate dissolved in heptane in 30% by weight, which were mixed to prepare an organic solvent solution of polycarbonate (PCM). As the polycarbonate particle (PCF), polycarbonate produced by Idemitsu Petrochemical Co., Ltd., under the trade name of Toughlon FN2200 was used, which was sieved to adjust the average particle diameter to 0.5 mm.

A vertical container having an effective inner volume of about 4 liters was provided with a mixer having three sets of paddles. This container was charged with 1,000 g of PCF, and PCM was supplied with stirring at a rate of 2 liters per hour. During introduction, the temperature of the container was maintained at 50° C. by heating with the jacket, and the pressure was maintained at 1.3 kg/cm$^2$ abs.

In one hour from the start of introduction, the level of particles in the container began to rise, and thus the polycarbonate particles formed were withdrawn at a rate of 600 g per hour on the average, utilizing the valve provided in the lower part of the container. When the particles have consistent properties after they were withdrawn, a sample was taken out of them. The average particle diameter of the particles was measured and found to be 0.41 mm. Then the sample was dried in a vacuum oven (temperature 130° C.) for one day and night, and its solvent content was measured and found to be 63% by weight.

The particles were placed in a drier container having a volume of 200 milliliters, and dried by heating at 130° C. for about 5 hours in a stream of nitrogen. The solvent content of the particle dropped to 0.002% by weight. Observation of the particle showed that there were obtained particles having a lot of voids and good drying properties.

EXAMPLE 18

The procedure of Example 17 was repeated with the exception that the type and amount of the poor solvent in the polymer solution were changed as shown in Table 4.

EXAMPLE 19

As the stirring vessel, a Turbo Sphere mixer (manufactured by Sumitomo Jukikai Kogyo Co., Ltd.) was used. This container was a spherical vessel having a volume of 8 liters, to the lower part of which was attached a stirring blade as an anchor type structure to sweep 50% of the contents. This container was charged with 50 liters of PCF. To the PCF, PCM was supplied at a rate of 50 liters per hour. Eight hours after the start of operation, particles formed were withdrawn as samples, which were then measured for average particle diameter. The average particle diameter was 0.33 mm, and the amount of the solvent was 32% by weight. On drying the sample with heated nitrogen, the amount of the solvent dropped to 0.0005% by weight; the sample was thoroughly dried.

Table 5 shows the results of measurement in each item of polycarbonate particles obtained in the preceding examples.

In accordance with the process of the present invention, there can be obtained polymer particles which have good drying properties and are greatly decreased in the residual solvent amount. Microscopic examination shows that the polymer particles of the present invention have a lot of voids.

TABLE 4

| | Polymer Solution | | | |
|---|---|---|---|---|
| | Polymer | | Poor Solvent | |
| No. | Concentration (wt %) | Amount Supplied (l/hr) | Amount introduced (wt %) | Type |
| Example 17 | 20 | 2 | 30 | Heptane |
| Example 18 | 25 | 3 | 5 | Heptane |
| Example 19 | 20 | 50 | 30 | Heptane |

TABLE 5

| | Sample just after Formation | | After Drying | |
|---|---|---|---|---|
| | Average | | | |
| No. | Particle Diameter (mm) | Amount of Solvent (wt %) | Amount of Solvent (ppm) | Bulk Density (g/cc) |
| Example 17 | 0.41 | 63 | 16 | 0.53 |
| Example 18 | 0.29 | 51 | 28 | 0.67 |
| Example 19 | 0.33 | 32 | 5 | 0.52 |

As the polymer for the organic solvent solution of polymer, polycarbonate (produced by Idemitsu Petrochemical Co., Ltd., Toughlon Ab 2500) was used. This was dissolved in methylene chloride (produced by Hiroshima Wako Junyaku Co., Ltd., special grade) in a polymer concentration of 10 to 20% by weight to prepare a methylene chloride solution of polycarbonate (PCM). In connection with polymer particles, as the polycarbonate flake (PCF), Toughlon FN2200, trade name, produced by Idemitsu Petrochemical Co., Ltd., was used, and sieved to adjust the average particle diameter to 0.5 mm.

As the particle producing vessel, a horizontal vessel (jacketed) having an effective inner volume of about 10 liters was employed, and in its practical use, it was provided with a mixer. First, the container was charged with 1,000 g of PCF and operated under conditions (PCM concentration, amount of PCM supplied, type of the poor solvent, amount of the poor solvent supplied, temperature, pressure and shape of the blade) as shown in Table 6. At the point that the amount of polycarbonate (PC) in the PCM supplied reached 500 g, about 500 g of the PCF was withdrawn from the bottom of the container. This operation was repeated and continued for 20 hours.

The PCF obtained was vacuum dried at 120° C. for 24 hours. The PCF obtained at the fourth withdrawal was measured for average particle diameter, amount of the residual solvent, and bulk density. The results of measurement are shown in Table 7.

In accordance with the process of the present invention (example), there can be obtained polymer particles which have good drying properties and are greatly decreased in the amount of the residual solvent. Microscopic examination showed that the polymer particles obtained in the example had a lot of voids.

TABLE 6

| | PCM | | Poor Solvent | |
|---|---|---|---|---|
| No. | Concentration (wt %) | Introduction Amount *1 (wt %) | Type | Introduction Amount *2 (wt %) |
| Example 20 | 20 | 100 | Heptane | 100 |
| Example 21 | 20 | 100 | Heptane | 30 |
| Example 22 | 30 | 100 | Heptane | 100 |

*1 Proportion based on the amount of the polymer particle held in the particle producing vessel.
*2 Proportion based on the amount of methylene chloride in the PCM supplied.

TABLE 7

| | Average Particle | Amount of Residual Solvent (ppm) | | Bulk |
|---|---|---|---|---|
| No. | Diameter (mm) | Methylene Chloride | Poor Solvent | Density (g/cc) |
| Example 20 | 0.30 | <20 | 100 | 0.69 |
| Example 21 | 0.86 | <20 | 90 | 0.51 |
| Example 22 | 0.30 | <20 | 110 | 0.69 |

As the granulator, a twin screw kneader having an inner volume of 1.0 m$^3$ and provided with a rotor having a length of 2.0 m and a diameter of 0.1 m was used. As the polymer for the organic solvent solution of polymer, polycarbonate (produced by Idemitsu Petrochemical Co., Ltd., Toughlon A2500) was used. This was dissolved in methylene chloride (produced by Hiroshima Wako Junyaku Co., Ltd., special grade) in a polymer concentration of 10 to 30% by weight to prepare a methylene chloride solution of polycarbonate (PCM). As polymer particles at the earlier stage of the operation, polycarbonate flake (PCF, produced by Idemitsu Petrochemical Co., Ltd., Toughlon FN2200) was used and sieved to adjust the average particle diameter to 0.5 mm.

As the granulator, the above twin screw kneader was used, and the above PCF was introduced thereinto and the kneader was operated at 30 revolutions by minute.

Operating conditions (PCM concentration, amount of PCM supplied, amount of PCF introduced, temperature and pressure) are shown in Table 8.

For evaluation of quality of the polymers obtained in the examples, average particle diameter and bulk density were measured. The results of measurement are shown in Table 9.

TABLE 8

| | PCM | | PCF | |
|---|---|---|---|---|
| No. | Concentration (wt %) | Introduction Amount (kg/hr) | Type of Introduction | Introduction Amount (kg/hr) |
| Example 23 | 30 | 100 | Recycle | 100 |
| Example 24 | 20 | 100 | Recycle | 100 |
| Example 25 | 30 | 100 | Recycle | 100 |

| No. | Temperature (°C.) | Pressure | PC Withdrawal Amount (kg/hr) |
|---|---|---|---|
| Example 23 | 60 | Atmospheric Pressure | 30 |
| Example 24 | 60 | Atmospheric Pressure | 20 |
| Example 25 | 50 | −200 mmHg | 30 |

TABLE 9

| No. | Average Particle Diameter (mm) | Bulk Density (g/cc) |
|---|---|---|
| Example 23 | 0.42 | 0.68 |
| Example 24 | 0.48 | 0.67 |
| Example 25 | 0.55 | 0.66 |

EXAMPLE 26

As the particle producing vessel, a disc T type drier manufactured by Tsukishima Kikai Co., Ltd. was used. This had a length of 1.8 m, an effective volume of 50 liters, a heat conductive surface of 1.2 m$^2$ and 10 paddles 18 cm in diameter, and was provided at the upper part thereof with a hole through which the organic solvent was to be withdrawn. Hot water maintained at 80° C. was flown through the jacket and the stirring blade.

As the polymer for the organic solvent solution of polymer, polycarbonate (produced by Idemitsu Petrochemical Co., Ltd., Toughlon A2500) was used. This was dissolved in methylene chloride (produced by Hiroshima Wako Junyaku Co., Ltd., special grade) in a polymer concentration of 10 to 30% by weight to prepare a methylene chloride solution of polycarbonate (PCM). As the polymer particle at the start of operation, polycarbonate flake (PCF, produced by Idemitsu Petrochemical Co., Ltd., Toughlon FN2200) was used, which was sieved to adjust the average particle diameter to 0.5 mm.

PCF in the amount of 30 kg (amount enough to hide the paddles) was charged, and operation was conducted at a number of revolutions of 30 rpm.

Into the above particle producing vessel was introduced 20% by weight PCM at 12 kg/h. The pressure was atmospheric pressure. At the time of stationary operation, polymer particles were withdrawn from the lower part at 2.4 kg/h. After 48 hours, a sample was taken out, dried at 120° C. for 24 hours, and measured for bulk density and average particle diameter.

EXAMPLE 27

Three introduction conduits a, b and c were provided in the above particle producing vessel, and 20% by weight PCM was introduced there through each at 12 kg/h. The pressure was atmospheric pressure. At the time of stationary operation, polymer particles were withdrawn from the lower part at 7.2 kg/h. After 12 hours, a sample was taken out, dried at 120° C. for 24 hours, and measured for bulk density and average particle diameter.

EXAMPLE 28

In the above particle producing vessel were provided six introduction conduits, through which 20% by weight PCM was introduced each at 12 kg/h. The pressure was atmospheric pressure. At the time of stationary operation, polymer particles were withdrawn from the lower part at 14.4 kg/h. After 6 hours, a sample was taken out, dried at 120° C. for 24 hours, and measured for bulk density and average particle diameter.

EXAMPLE 29

In the above particle producing vessel were provided ten introduction conduits, through which 20% by weight PCM was introduced each at 12 kg/h. The pressure was atmospheric pressure. At the time of stationary operation, polymer particles were withdrawn from the lower part at 24 kg/h. After 6 hours, a sample was taken out, dried at 120° C. for 24 hours, and measured for bulk density and average particle diameter.

EXAMPLE 30

The procedure of Example 29 was repeated with the exception that the PCM concentration was changed to 30% by weight, and the polymer particles were withdrawn at 36 kg/h.

EXAMPLE 31

The procedure of Example 29 was repeated with the exception that the PCM concentration was changed to 10% by weight, and the polymer particles were withdrawn at 12 k/h.

EXAMPLE 32

The procedure of Example 29 was repeated with the exception that the pressure was changed to −200 mmHg.

The polymer particles obtained in Examples 26 to 32 were measured for bulk density and average particle diameter, and the results are shown in Table 10.

It can be seen that in the examples of the present invention, polymer particles having an average particle diameter of about 0.50 mm and excellent in quality can be obtained with high productivity as seen in Examples 27 to 29.

TABLE 10

| No. | Average Particle Diameter (mm) | Bulk Density (g/cc) |
| --- | --- | --- |
| Example 26 | 0.50 | 0.62 |
| Example 27 | 0.51 | 0.62 |
| Example 28 | 0.51 | 0.61 |
| Example 29 | 0.52 | 0.63 |
| Example 30 | 0.51 | 0.61 |
| Example 31 | 0.53 | 0.64 |
| Example 32 | 0.56 | 0.65 |

As described above, in accordance with the present invention, polymer particles can be obtained by evaporating an organic solvent while keeping a solution of polymer in the organic solvent in contact with polymer particles, using a simple apparatus and operation. Further, by applying various modifications in the process of production, if necessary, there can be obtained polymer particles (powder) having a small particle diameter, a high bulk density, a small amount of residual solvent and thus excellent in quality, with high efficiency.

Accordingly, simplification of the process is attained, and along with a reduction of construction cost and running cost, production of high quality polymer in a stabilized manner can be attained.

We claim:

1. A process for producing polymer particles from an organic solvent solution of a polymer, which comprises:

(a) initially introducing polymer particles into a particle producing zone, (b) introducing an organic solvent solution containing an organic solvent and having a polymer concentration of 3 to 70% by weight, onto said polymer particles which are maintained in said particle producing zone, said particle producing zone not substantially containing steam, said organic solvent solution being added in an amount of not more than 100% by weight per hour based on the amount of the polymer particles which are initially held in said particle producing zone, and stirring said polymer particles under conditions in which said organic solvent would be vaporized, (c) separately introducing a poor solvent for said polymer into said particle producing zone, said poor solvent being selected from the group consisting of benzene, toluene, xylene, pentane, hexane, octane, acetone and methyl ethyl ketone, said poor solvent being in an amount of 5 to 200% by weight based on the weight of said organic solvent in said organic solvent solution, and (d) evaporating said organic solvent and said poor solvent, while maintaining said organic solvent solution of said polymer in contact with said polymer particles which are maintained in said particle producing zone, to produce said polymer particles.

2. A process for producing polymer particles from an organic solvent solution of a polymer, which comprises:

(a) initially introducing polymer particles into a particle producing zone, (b) introducing an organic solvent solution containing an organic solvent and having a polymer concentration of 3 to 70% by weight, onto said polymer particles which are maintained in said particle producing zone, said particle producing zone not substantially containing steam, said organic solvent solution being added in an amount of not more than 250% by weight per hour based on the amount of the polymer particles which are initially held in said particle producing zone, and stirring said polymer particles under conditions in which said organic solvent would be vaporized, (c) separately introducing a poor solvent for said polymer into said particle producing zone, said poor solvent being selected from the group consisting of benzene, toluene, xylene, pentane, hexane, octane, acetone and methyl ethyl ketone, said poor solvent being in an amount of 5 to 200% by weight based on the weight of said organic solvent in said organic solvent solution, said poor solvent is introduced into said particle producing zone after gasification thereof, and (d) evaporating said organic solvent and said poor solvent, while maintaining said organic solvent solution of said polymer in contact with said polymer particles which are maintained in said particle producing zone, to produce said polymer particles.

3. The process as claimed in claim 1 wherein the particle producing zone is a complete mixing particle producing vessel.

4. A process for producing polymer particles from an organic solvent solution of a polymer, which comprises:

(a) initially introducing polymer particles into a horizontal particle producing vessel having a horizontal particle producing zone, (b) introducing an organic solvent containing an organic solvent and having a polymer concentration of 3 to 70% by weight, onto said polymer particles which are maintained in said horizontal particle producing zone, said horizontal particle producing zone not substantially containing steam, said organic solvent solution being added in an amount of not more than 100% by weight per hour based on the amount of the polymer particles which are initially held in said horizontal particle producing zone, and stirring said polymer particles under conditions in which said organic solvent would be vaporized, (c) separately introducing a poor solvent for said polymer into said horizontal particle producing zone, said poor solvent being selected from the group consisting of benzene, toluene, xylene, pentane, hexane, octane, acetone and methyl ethyl ketone, said poor solvent being in an amount of 5 to 200% by weight based on the weight of said organic solvent in said organic solvent solution, and (d) evaporating said organic solvent and said poor solvent, while maintaining said organic solvent solution of said polymer in contact with said polymer particles which are maintained in said horizontal particle producing zone, to produce said polymer particles.

5. The process as claimed in claim 4 wherein said process is continuous and the polymer particles are stirred homogenously.

6. The process as claimed in claim 5 wherein in introducing the organic solvent solution into the horizontal particle producing vessel, the solution is divided and introduced from a plurality of points.

7. The process as claimed in claim 1 wherein the organic solvent is methylene chloride.

8. The process as claimed in claim 1 wherein the polymer is selected from the group consisting of polycarbonate and polyarylate.

9. The process as claimed in claim 8 wherein said organic solvent is methylene chloride.

10. The process as claimed in claim 1 wherein said polymer is selected from the group consisting of polycarbonate, polyarylate and polyamide; said organic solvent is selected from the group consisting of methylene chloride, chloroform, chlorobenzene, dioxane and tetrahydrofuran; and the process is carried out at a temperature of 0° to 200° C., at an absolute pressure of 0.1 to 11 kg/cm$^2$ and with a residence time of polymer particles in the particle producing zone of 0.01 to 10 hours.

11. The process as claimed in claim 10 wherein said polymer is dissolved in said organic solvent in a concentration of 10 to 60% by weight; said temperature is 30 to 150° C. and said pressure is 0.5 to 5 kg/cm$^2$.

12. The process as claimed in claim 11 wherein said polymer is polycarbonate having a particle diameter of 50 µm to 3 µmm.

13. The process as claimed in claim 1 wherein the process is continuous and said polymer particles are stirred homogeneously.

14. The process as claimed in claim 1 wherein a portion of said polymer particles produced in said particle producing zone is continuously recycled to said particle producing zone.

15. The process as claimed in claim 2 wherein said organic solvent solution is in an amount of not more than 100% by weight per hour based on the amount of said polymer particles held in said polymer producing zone.

* * * * *